(12) United States Patent
Devine et al.

(10) Patent No.: US 11,978,249 B2
(45) Date of Patent: May 7, 2024

(54) AUTOMATED MAPPING OF FEATURES OF INTEREST

(71) Applicant: FUGRO N.V., Leidschendam (NL)

(72) Inventors: Christine Devine, Perth (AU); William Haneberg, Lexington, KY (US)

(73) Assignee: Fugro N.V., Leidschendam (NL)

( * ) Notice: Subject to any disclaimer, the term of this patent is extended or adjusted under 35 U.S.C. 154(b) by 557 days.

(21) Appl. No.: 17/271,138

(22) PCT Filed: Aug. 24, 2019

(86) PCT No.: PCT/IB2019/057131
§ 371 (c)(1),
(2) Date: Feb. 24, 2021

(87) PCT Pub. No.: WO2020/039406
PCT Pub. Date: Feb. 27, 2020

(65) Prior Publication Data
US 2021/0248414 A1    Aug. 12, 2021

Related U.S. Application Data

(60) Provisional application No. 62/722,426, filed on Aug. 24, 2018.

(51) Int. Cl.
*G06K 9/62* (2022.01)
*G01S 17/88* (2006.01)
(Continued)

(52) U.S. Cl.
CPC .............. *G06V 20/13* (2022.01); *G01S 17/88* (2013.01); *G06F 18/2113* (2023.01);
(Continued)

(58) Field of Classification Search
CPC ...... G06V 20/13; G06V 10/273; G06V 10/26; G06V 20/194; G06N 20/00; G06F 18/253;
(Continued)

(56) References Cited

U.S. PATENT DOCUMENTS

| 8,379,913 B1 | 2/2013 | Robinson et al. |
| 2010/0157736 A1* | 6/2010 | Riordan ................. G01S 15/87 367/88 |

(Continued)

FOREIGN PATENT DOCUMENTS

WO    2020039406 A1    2/2020

OTHER PUBLICATIONS

Espinoza-Molina et al, "Earth-Observation Image Retrieval Based on Content, Semantics, and Metadata", 2013, IEEE Transactions On Geoscience and Remote Sensing, vol. 51, No. 11, pp. 5145-5159 (15 pages) (Year: 2013).*

(Continued)

*Primary Examiner* — David F Dunphy
(74) *Attorney, Agent, or Firm* — Polsinelli PC (57) ABSTRACT

A computer-implemented method for identifying features of interest in a data image. The method includes identifying data variations in a data image or set of data images, each data image comprising rendered data, identifying one or more features of interest in the data image or set of data images based on the identified data variations, identifying a feature of interest genus corresponding to each identified feature of interest, reclassifying the rendered data based on each of the identified features of interest genuses so as to eliminate background data in the rendered data thereby producing an eliminated background dataset, and generating a feature of interest map for each identified feature of interest genus. A machine learning method, including a (Continued)

training phase, for automatically identifying features of interest in a data image is further provided.

19 Claims, 6 Drawing Sheets

(51) Int. Cl.
| | |
|---|---|
| *G06F 18/2113* | (2023.01) |
| *G06F 18/213* | (2023.01) |
| *G06F 18/214* | (2023.01) |
| *G06F 18/2413* | (2023.01) |
| *G06F 18/25* | (2023.01) |
| *G06K 9/00* | (2022.01) |
| *G06K 9/34* | (2006.01) |
| *G06N 20/00* | (2019.01) |
| *G06V 10/26* | (2022.01) |
| *G06V 20/13* | (2022.01) |
| *G01S 7/481* | (2006.01) |
| *G06V 20/10* | (2022.01) |

(52) U.S. Cl.
CPC .......... *G06F 18/213* (2023.01); *G06F 18/214* (2023.01); *G06F 18/2413* (2023.01); *G06F 18/253* (2023.01); *G06N 20/00* (2019.01); *G06V 10/26* (2022.01); *G06V 10/273* (2022.01); *G01S 7/4814* (2013.01); *G06V 20/194* (2022.01)

(58) Field of Classification Search
CPC ............. G06F 18/2413; G06F 18/2113; G06F 18/214; G06F 18/213; G01S 17/88; G01S 7/4814
See application file for complete search history.

(56) References Cited

U.S. PATENT DOCUMENTS

| | | | |
|---|---|---|---|
| 2011/0055746 A1* | 3/2011 | Mantovani | B63C 11/26 715/848 |
| 2019/0033447 A1* | 1/2019 | Chan | G06F 18/24133 |

OTHER PUBLICATIONS

International Search Report and Written Opinion; PCT Application No. PCT/IB2019/057131; dated Nov. 25, 2019.
Devine, Christine et al., OTC-27391-MS Optimization Methods for Arctic Pipeline Route Selection:, Oct. 24, 2016, XP055643020, retrieved from the Internet; URL:https://www.onepetro.org.
Capes Renalt et al., "On Safe Ground: Analysis of European Urban Geohazards Using Satellite Radar Interferometry", International Journal of Applied Earth Observation and Geoinformation, Elsevier, Amsterdam, NL, vol. 58, Feb. 9, 2017; pp. 74-85, XP029937834.

* cited by examiner

AUTOMATED MAPPING OF FEATURES OF INTEREST

CROSS-REFERENCE TO RELATED APPLICATIONS

This application is a national stage application of International Application No. PCT/IB2019/057131, which was filed on Aug. 24, 2019, which claims priority to U.S. Provisional Application No. 62/722,426 filed on Aug. 24, 2018, of which is incorporated by reference in its entirety.

FIELD

The present disclosure relates to automated or semi-automated mapping of features of interest from datasets and/or images. In particular, the present disclosure relates to computer-implemented mapping of features of interest, such as exploitable features and geohazards, from datasets and/or images comprising optical images or instrument data renderings acquired for a portion of the terrestrial surface or a planetary surface.

BACKGROUND

Geospatial data images, representing a portion of the earth's surface, may be used to identify features of interest such as commercially exploitable features or geohazards. In particular, the effective identification and mapping of subsea geohazards is critical to safe and economically efficient subsea operations, including oil and gas operations. Subsea geospatial data images may be collected in many different forms, including, for example, multibeam echosounder (MBES) bathymetry data, datasets from spectral sensors, satellite imagery, airborne laser bathymetry, and optical images from autonomous or remote-operated vehicles. While large amounts of subsea geospatial data are generated, the identification and mapping of features of interest is a critical and often rate-limiting step in data image processing and analysis. Accordingly, improved methods of analyzing and processing geospatial data are desirable.

Machine learning is capable of analyzing tremendously large datasets at a scale that continues to increase. Using various machine learning techniques and frameworks, it is possible to analyze datasets to extract patterns and correlations that may otherwise have never been noticed when subject to human analysis alone. Using carefully tailored data inputs a machine learning system can be manipulated to learn a desired operation, function, or pattern. However, this training process is complicated by the fact that the machine learning system's inner functionality remains largely opaque to the human observer and analytical results from machine learning techniques may be highly input or method dependent. For instance, training datasets can easily be insufficient, biased or too small resulting in faulty or otherwise insufficient training. As a result, it is desirable to provide effective automated mapping methods utilizing machine learning.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As used herein, the term "feature of interest" refers to a particular portion of a dataset and/or images representing a potentially significant mappable feature. As used herein, the term "feature of interest genus" refers to a category corresponding to a particular "feature of interest." For example, a "feature of interest" in a particular portion of a dataset may be a channel on the ocean floor. In such cases, the "feature of interest" would refer to the particular channel occupying a portion of a dataset and corresponding to the "feature of interest genus" of subsea channels. Accordingly, there may be many features of interest in a particular dataset with each feature of interest belonging to a particular feature of interest genus. There may also be many feature of interest genuses represented in a single dataset. While in some instances the terms "dataset and/or images" are used it is also contemplated that the dataset includes images or some combination of data and images.

The present disclosure is directed to methods for the automated mapping of features of interest, such as exploitable features, geological features, and geohazards, using datasets. The presently disclosed methods providing automated mapping of features of interest on the terrestrial and subsea surface may provide for rapid and efficient analysis of large spatial areas as well as quick assessment of conditions in a study area compared to labor intensive and time-consuming manual mapping of such features. The presently disclosed methods are suited to automated identification and mapping of features of interest from datasets having representations of similar colors, geometric shapes or sizes, or topographic predictability over a large area.

The presently disclosed automated mapping methods may be applied to datasets, which may be any image comprising rendered data, such as optical images or visual imagery, including, for example, greyscale or color photo mosaics, or data-derived renderings based on digital elevation models for terrestrial or subsea surfaces, including, for example, quantitative slope or hill-shade renderings. The data images may be renderings derived from multibeam echo-sounder (MBES) bathymetry data. The presently disclosed automated mapping methods may also be applied to datasets collected from spectral analyzers or imaging spectroscopy, including datasets produced by hyper-spectral (HS) sensors and multi-spectral (MS) imaging that may be airborne or satellite-borne. The datasets may also be data-derived renderings collected from airborne or satellite-borne laser bathymetry such as Light Detection and Ranging (LIDAR), Airborne Laser Bathymetry (ALB), and LIDAR bathymetry systems. The data images may also include high resolution orthoimagery (HRO).

According to at least one aspect of the present disclosure, a computer-implemented method for identifying features of interest in a dataset is provided. The method may include identifying data variations in a dataset or set of data images. Each dataset may include rendered data. The method further includes identifying one or more features of interest in the dataset or set of data images based on the identified data variations and identifying a feature of interest genus corresponding to each identified feature of interest. The method may further include reclassifying the rendered data based on each of the identified features of interest genuses so as to eliminate background noise in the rendered data thereby producing an eliminated background dataset (e.g., removing noise or non-feature of interest data points from the dataset or images etc.). The method may also include generating a feature of interest map for each identified feature of interest genus.

The method may optionally include isolating features of interest having a predetermined size or significance by eliminating the polygons of unnecessary features of interest not having the predetermined size or significance. The method may also include converting the features of interest into polygons for each eliminated background dataset (e.g., removing noise or non-feature of interest data points from the dataset or images, etc.). In some instances, a geometry of the polygons corresponding to each feature of interest and/or a spatial parameter corresponding to the polygons for each feature of interest may be calculated. In such instances, the spatial parameter may, for example, correspond to the spatial positioning of a feature of interest. In such instances, the method may further include determining whether each feature of interest has a predetermined geometry of significance based on the calculated geometry of the polygons and/or whether each feature of interest has a predetermined spatial parameter of significance based on the calculated spatial parameter of the polygons. Relative weights may be assigned to each feature of interest based on either the calculated geometry or the calculated spatial parameter. In such cases, a weighted feature of interest map may be generated for each identified feature of interest genus based on the assigned relative weights to each feature of interest.

In some instances, a feature of interest map may be generated for each identified feature of interest genus. A composite feature of interest map may also be generated for all features of interest corresponding to all feature of interest genuses. The method may also include performing a statistical analysis for the features of interest in the feature of interest map, the weighted feature of interest map, or the composite feature of interest map in order to determine if the particular map is characterized by a predetermined significance based on the performed statistical analysis.

According to at least one aspect of the present disclosure, a computer-implemented method for identifying features of interest in a data image using machine learning. The method may include a training phase and an identification phase. The training phase may include accessing a training data image set with at least one training data image. Each training data image includes a rendering of a feature of interest corresponding to a feature of interest genus. The training phase may further include determining one or more data variation characteristics corresponding to the feature of interest and storing the one or more data variation characteristics corresponding to the feature of interest in a training database. The training phase may further include determining a feature of interest genus corresponding to the feature of interest based on the determined one or more data variation characteristics and storing the feature of interest genus corresponding to the feature of interest in the training database.

The method may further include an identification phase that includes accessing a dataset that includes at least one feature of interest and automatically identifying a feature of interest in the dataset based on one or more data variation characteristics stored in the training database. The identification phase may further include automatically identifying a feature of interest genus corresponding to the identified feature of interest based on the one or more data variation characteristics stored in the training database.

The method may optionally include an analysis phase. The analysis phase may include reclassifying the rendered data in the dataset based on the identified feature of interest or the identified feature of interest genus to reduce or eliminate background noise in the rendered data and produce an eliminated background dataset (e.g., removing noise or non-feature of interest data points from the dataset or images, etc.). The analysis phase may further include converting the identified features of interest into polygons for each eliminated background dataset (e.g., removing noise or non-feature of interest data points from the dataset or images, etc.). The analysis phase may also include isolating features of interest having a predetermined size or significance by eliminating the polygons of unnecessary features of interest not having the predetermined size or significance. The analysis phase may also include calculating a geometry of the polygons corresponding to each feature of interest and/or calculating a spatial parameter corresponding to the polygons for each feature of interest. In such cases, the method may further include determining whether each feature of interest has a predetermined geometry of significance based on the calculated geometry of the polygons and/or whether each feature of interest has a predetermined spatial parameter of significance based on the calculated spatial parameter of the polygons. Relative weights may be automatically assigned to each feature of interest based on either the calculated geometry or the calculated spatial parameter. In such cases, a weighted feature of interest map may be automatically generated for each identified feature of interest genus based on the assigned relative weights to each feature of interest.

In some instances, the analysis phase may also include generating a feature of interest map for each identified feature of interest genus and/or generating a composite feature of interest map for all features of interest corresponding to all feature of interest genuses. The analysis phase may also include automatically performing a statistical analysis for the features of interest in the feature of interest map, the weighted feature of interest map, or the composite feature of interest map in order to determine if the particular map is characterized by a predetermined significance based on the performed statistical analysis.

Figure 1:
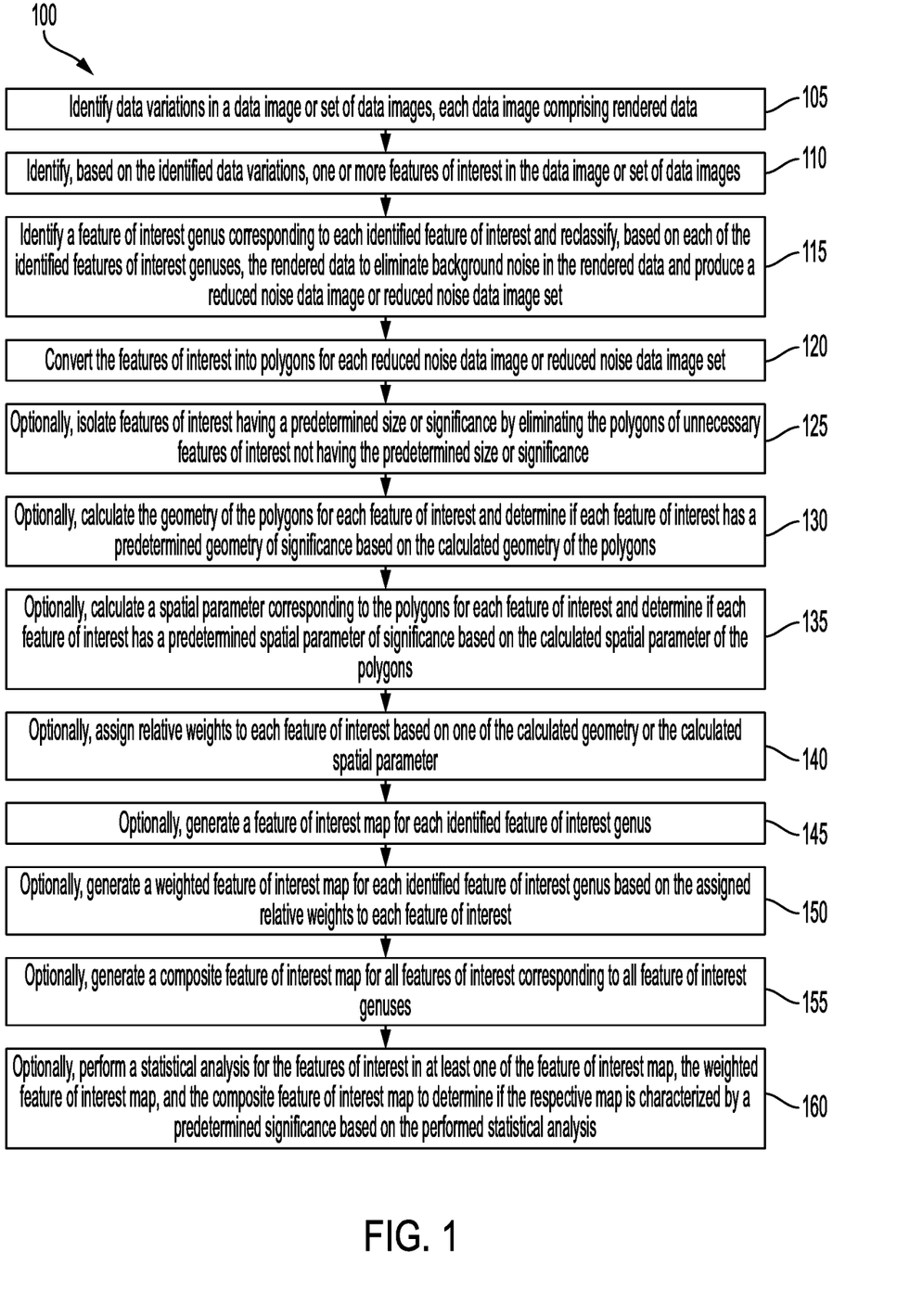
FIG. 1 is a flowchart describing a method of identifying and analyzing one or more features of interest in a data image or set of data images, according to an exemplary embodiment of the present disclosure.

FIG. 1 depicts a flowchart describing a method of identifying and analyzing one or more features of interest in a dataset or set of data images, according to an exemplary embodiment of the present disclosure. The example method shown in FIG. 1 is provided by way of an example, as there are a variety of ways to carry out the method. Each block shown in FIG. 1 represents one or more processes or methods carried out in the example method shown in FIG. 1. Furthermore, the illustrated order of blocks is illustrative only and the order of the blocks can change according to the present disclosure. Additional blocks can be added or fewer blocks can be utilized, without departing from this disclosure. Method 100 depicted in FIG. 1 is an example method, according to an example embodiment of the present disclosure. The method 100 depicted in FIG. 1 is just an example method and can be adopted to various operating environments by adding or removing one or more blocks. The example method 100 can begin at block 105. At block 105, data variations in a dataset or set of data images are identified. Identifiable data variations may include, for example, recognizable patterns in the dataset or abrupt changes in portions of the data image representing changes in color, contrast or shading, tonal roughness, steepness or slope, and/or curvature. In at least some instances, the identification of data variations in a dataset or set of data images may include performing an analysis of the dataset such as a gamma analysis, a gamma and edge detection, morphological filtering, high-gain boost, high- and low-pass filtering, binarization. Further analysis of the dataset can encompass an aspect ratio threshold analysis, ellipse fitting to elongated features, and preferred orientation analysis. At block 110, the method further includes identifying one or more features of interest in the dataset or set of data images based on the identified data variations. Identifiable features of interest may include commercially exploitable features of interest, geological features, and geohazards. Examples of commercially exploitable features of interest may include geologic formations of interest, subsea petroleum seeps, terrestrial petroleum seeps, subsea mineral deposits, lost cargo from vessels, subsea wreckage of vessels, un-exploded ordinance (UXO), terrestrial and subsea plane wreckages, unexploded ordinance (UXO), and spacecraft or satellite remains. Geological features that may be mapped according to the presently disclosed methods may include fault scarps, pockmarks, boulders, subsea or terrestrial channels, seafloor bedform crests, seafloor depressions, seafloor mounds, and strudel scours. The presently disclosed methods may also be used to map geohazards, such as icebergs, sea ice, strudel scouring, boulders, dropstones (ice-rafted debris), upheaval zones, ridges, seamounts, hydrothermal vents, gas hydrates, thaw settlement depressions, slump deposits, turbidity flows, slope failures, fluid expulsion features, and faults.

Method 100 may further include identifying a feature of interest genus corresponding to each identified feature of interest, as depicted at block 115. The feature of interest genuses may be the same as any of those categories described above with respect to the identifiable features of interest (e.g., the commercially exploitable features, geological features, and geohazards). The image data may then be reclassified based on each of the identified features of interest genuses so as to eliminate background noise in the rendered data thereby producing an eliminated background dataset (e.g., removing noise or non-feature of interest data points from the dataset or images, etc.). In at least some instances, the eliminated background dataset may be produced by nulling all the background data points and assigning one or multiple values to the features of interest genuses. At block 120, the portions of the data image corresponding to the features of interest are converted into polygons for each eliminated background dataset (e.g., removing noise or non-feature of interest data points from the dataset or images, etc.).

At block 125, method 100 may optionally include isolating features of interest having a predetermined size or significance by eliminating the polygons of unnecessary features of interest not having the predetermined size or significance. Method 100 may also include, at block 130, calculating a geometry of the polygons corresponding to each feature of interest and determining if each feature of interest has a predetermined geometry of significance based on the calculated geometry of the polygons. At block 135, method 100 may include calculating a spatial parameter corresponding to the polygons for each feature of interest and determining if each feature of interest has a predetermined spatial parameter of significance based on the calculated spatial parameter of the polygons. At block 140, the relative weights to each feature of interest may be assigned based on either the calculated geometry or the calculated spatial parameter.

In at least some instances, a feature of interest map may be generated for each identified feature of interest genus, at block 145. At block 150, a weighted feature of interest map for each identified feature of interest genus may be generated based on the assigned relative weights to each feature of interest. Additionally, a composite feature of interest map may be generated, at block 155, for all features of interest corresponding to all features of interest genuses. A statistical analysis may be performed, at block 160, for the features of interest in either the feature of interest map, the weighted feature of interest map, and/or the composite feature of interest map in order to determine if the respective map is characterized by a predetermined significance based on the performed statistical analysis.

Figure 2:
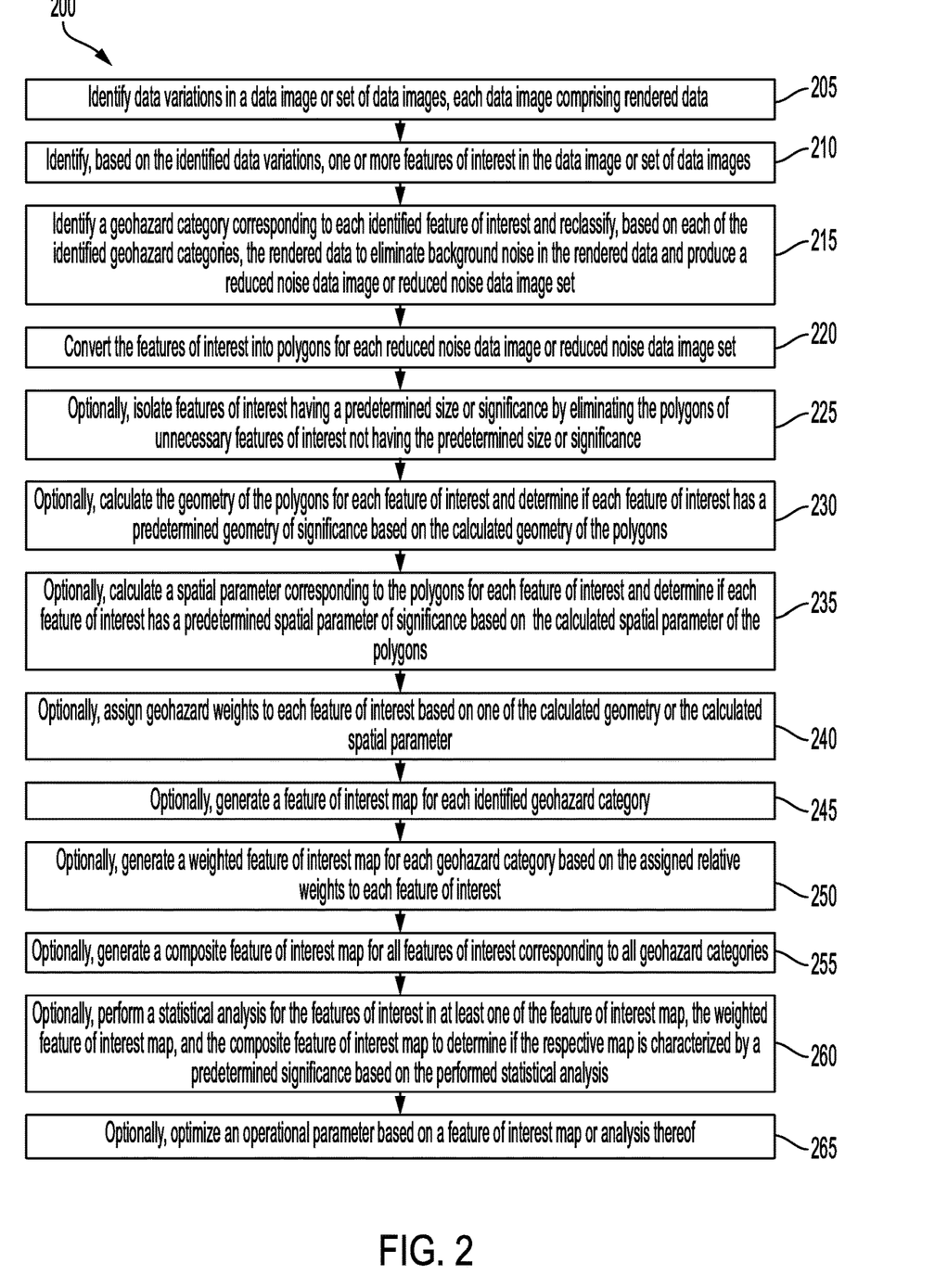
FIG. 2 is a flowchart describing a method of identifying and analyzing one or more geohazards of interest in a data image or set of data images, according to an exemplary embodiment of the present disclosure.

FIG. 2 depicts a flowchart describing a method of identifying and analyzing one or more geohazards of interest in a dataset or set of data images, according to an exemplary embodiment of the present disclosure. The example method shown in FIG. 2 is provided by way of an example, as there are a variety of ways to carry out the method. Each block shown in FIG. 2 represents one or more processes or methods carried out in the example method shown in FIG. 2. Furthermore, the illustrated order of blocks is illustrative only and the order of the blocks can change according to the present disclosure. Additional blocks can be added or fewer blocks can be utilized, without departing from this disclosure.

Method 200 depicted in FIG. 2 is an example method, according to an example embodiment of the present disclosure. The method 200 depicted in FIG. 2 is just an example method and can be adopted to various operating environments by adding or removing one or more blocks. The example method 200 depicted in FIG. 2 is substantially the same as the method depicted in FIG. 1 except that method 200 is specifically directed to the identification of geohazards in a dataset or set of data images. Once identified, the geohazards, and the generated geohazard maps may be used to optimize an operational parameter, at block 265, based on the geohazard map or analysis thereof. For instance, the geohazard map or maps produced according the presently disclosed methods may be used to optimize a subsea pipeline route by selecting a route that is characterized by less geohazard risk in view of the generated geohazard maps, weighted geohazard maps, or composite geohazard maps. Such a technique offers a more sophisticated approach to pipeline route selection compared with traditional routing practices based on only the shortest length of pipe or connectivity to existing infrastructure. This is particularly useful in arctic subsea environments which are often characterized by unique geologic complexities compared to other types of subsea environments making geohazard avoidance or mitigation crucial.

Figure 3:
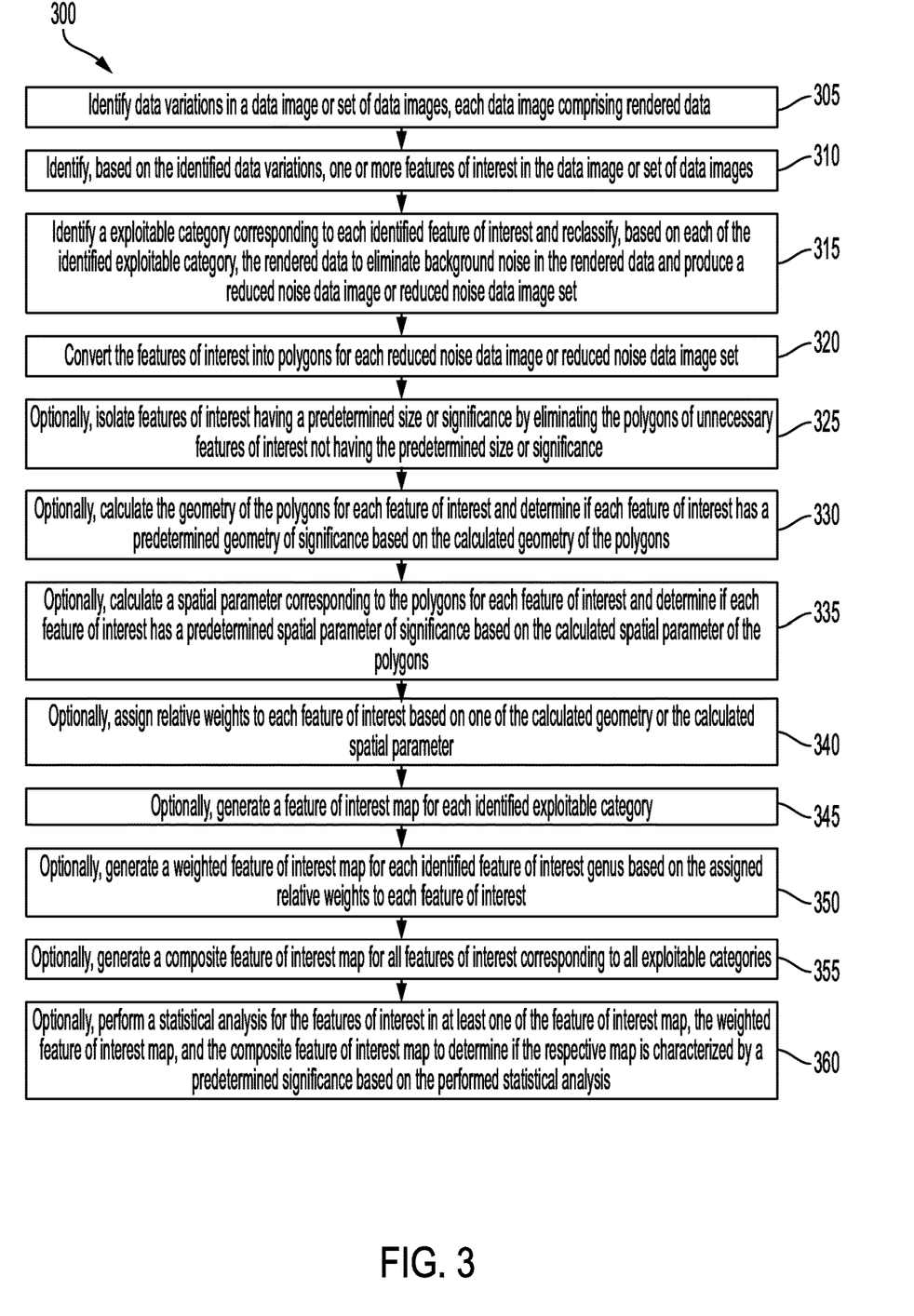
FIG. 3 is a flowchart describing a method of identifying and analyzing one or more exploitable features of interest in a data image or set of data images, according to an exemplary embodiment of the present disclosure.

FIG. 3 depicts a flowchart describing a method of identifying and analyzing one or more geohazards of interest in a data image or set of data images, according to an exemplary embodiment of the present disclosure. The example method shown in FIG. 3 is provided by way of an example, as there are a variety of ways to carry out the method. Each block shown in FIG. 3 represents one or more processes or methods carried out in the example method shown in FIG. 3. Furthermore, the illustrated order of blocks is illustrative only and the order of the blocks can change according to the present disclosure. Additional blocks can be added or fewer blocks can be utilized, without departing from this disclosure.

Method 300 depicted in FIG. 3 is an example method, according to an example embodiment of the present disclosure. The method 300 depicted in FIG. 3 is just an example method and can be adopted to various operating environments by adding or removing one or more blocks. The example method 300 depicted in FIG. 3 is substantially the same as the method depicted in FIG. 1 except that method 300 is specifically directed to the identification of commercially exploitable features of interest in a data image or set of data images. Once identified, the exploitable features of interest, and the exploitable feature of interest maps may be used in support of commercial decisions to, for example, exploit a mineral deposit or conduction further exploration activities. Such a technique offers a more sophisticated approach to the planning and risk evaluation associated with many commercial exploitation activities.

Additionally, composite maps of exploitable features of interest and geohazards may be generated for the same area of interest in order to assess risk factors associated with undergoing exploration activities in the study are of interest. For example, petroleum exploration in a study area may be undertaken, at least in part, based on an exploitation feature of interest map showing petroleum seeps in the study area. Additionally, the risk of exploration of in the same study area may be assessed using geohazard maps produced for the same area of interest.

Figure 4:
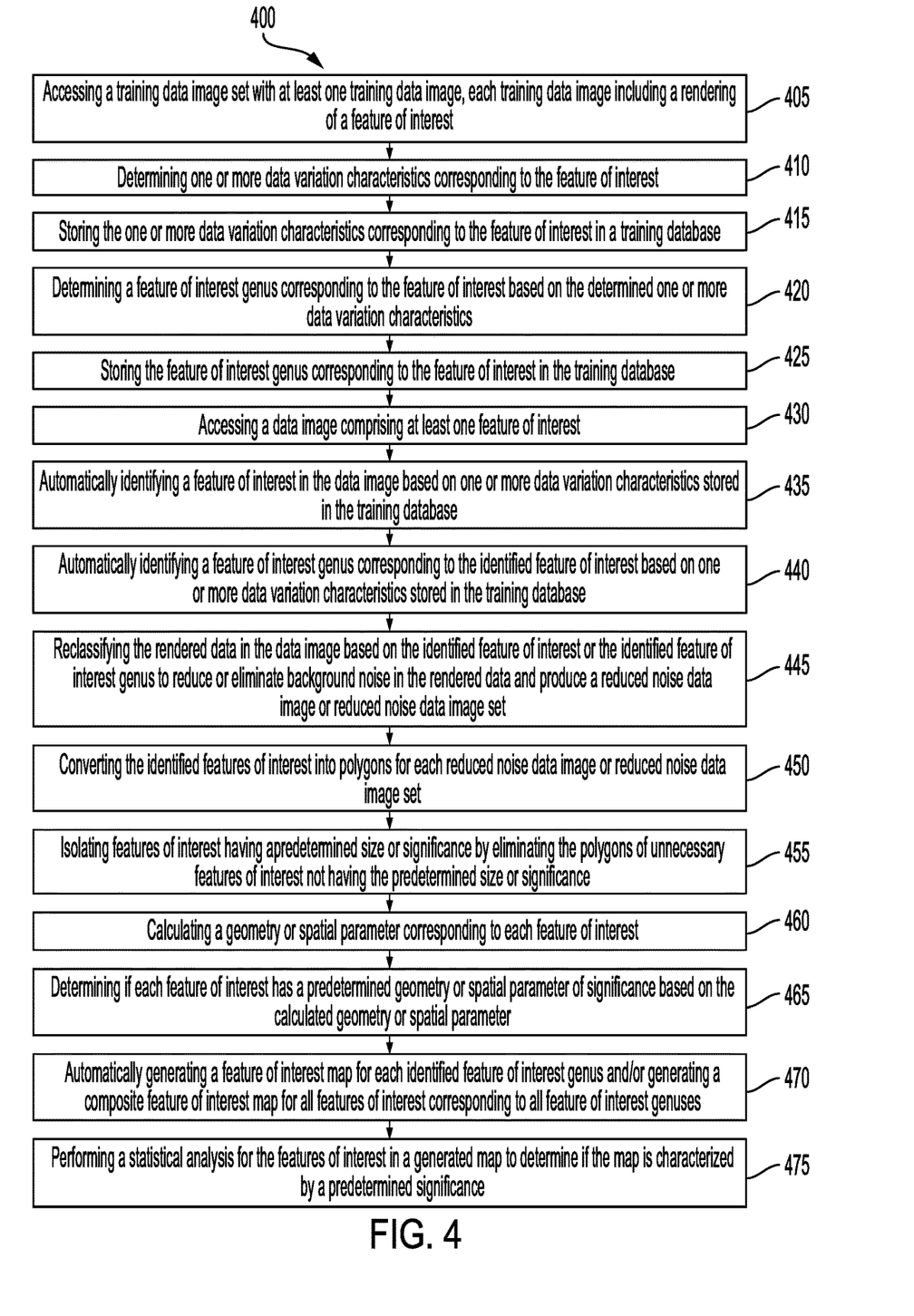
FIG. 4 is a flowchart describing a machine learning method of identifying and analyzing one or more features of interest in a data image or set of data images, according to an exemplary embodiment of the present disclosure.

FIG. 4 depicts a flowchart describing a machine learning method of identifying and analyzing one or more features of interest in a data image or set of data images, according to an exemplary embodiment of the present disclosure. Method 400, depicted in FIG. 4, provides a method by which features of interest may be automatically identified using a machine learning technique involving a training phase and an identification phase. The example method shown in FIG. 4 is provided by way of an example, as there are a variety of ways to carry out the method. Each block shown in FIG. 4 represents one or more processes or methods carried out in the example method shown in FIG. 4. Furthermore, the illustrated order of blocks is illustrative only and the order of the blocks can change according to the present disclosure. Additional blocks can be added or fewer blocks can be utilized, without departing from this disclosure.

Method 400 depicted in FIG. 4 is an example method, according to an example embodiment of the present disclosure. The method 400 depicted in FIG. 4 is just an example method and can be adopted to various operating environments by adding or removing one or more blocks. The example method 400 can begin at block 405. At block 405, a training phase is initiated by accessing a training dataset with at least training data and/or a training data image. Each training dataset includes a rendering of a feature of interest. The training phase also includes, at block 410, determining one or more data variation characteristics corresponding to the feature of interest. At block 415, the one or more data variation characteristics corresponding to the feature of interest are stored in a training database. The training phase of method 400 further includes, at block 420, determining a feature of interest genus corresponding to the feature of interest based on the determined one or more data variation characteristics. The feature of interest genus corresponding to the feature of interest is stored in the training database at block 425.

At block 430, an identification phase is initiated by accessing a dataset that includes at least one feature of interest. The identification phase of method 400 further includes automatically identifying a feature of interest in the dataset based on one or more data variation characteristics stored in the training database. At block 440, the identification phase further includes identifying a feature of interest genus corresponding to the identified feature of interest based on one or more data variation characteristics stored in the training database.

Method 400 may also optionally include an analysis phase. The analysis phase may include, at block 445, reclassifying the rendered data in the dataset based on the identified feature of interest or the identified feature of interest genus so as to reduce or eliminate background noise in the rendered data and produce an eliminated background dataset (e.g., removing noise or non-feature of interest data points from the dataset or images, etc.). At block 450, the analysis phase may include converting the identified features of interest into polygons for each eliminated background dataset (e.g., removing noise or non-feature of interest data points from the dataset or images, etc.). At block 455, the analysis phase may optionally include isolating features of interest having a predetermined size or significance by eliminating the polygons of unnecessary features of interest not having the predetermined size or significance. A geometry or spatial parameter may be calculated for each feature of interest at block 460. At block 465, the analysis phase may include determining if each feature of interest has a predetermined geometry or spatial parameter of significance based on the calculated geometry or spatial parameter. At block 470, the analysis phase may include automatically generating a feature of interest map for each identified feature of interest genus or automatically generating a composite feature of interest map for all features of interest corresponding to all feature of interest genuses. Additionally, relative weights may be assigned to each feature of interest based on either the calculated geometry or the calculated spatial parameter, and a weighted feature of interest map generated as shown at blocks 140 and 150 described above with respect to FIG. 1. Finally, the analysis phase of method 400 may include, at block 475, performing a statistical analysis for the features of interest in any of the generated maps to determine if the map is characterized by a predetermined significance. For example, a statistical analysis may be performed on any one of the feature of interest maps, weighted feature of interest maps, and composite feature of interest maps.

It is understood that the referenced machine learning algorithms or networks can take various forms and implementations as would be appreciated by one of ordinary skill in the art and are not restricted to a singular type or construction. For the sake of clarity, the instant disclosure refers primarily to convolutional neural networks (CNNs), artificial neural networks (ANNs), and long short-term memory networks (LTSMs), although again, it is contemplated that the various machine learning networks as are known in the art may be utilized without departing from the scope of the instant disclosure. Similarly, the training data (and the training process itself, as will be later described) can be adjusted for various categories of machine learning, including supervised learning, unsupervised learning, semi-supervised learning, reinforcement learning, etc. Additionally, the presently disclosed techniques and methods are subject to monitoring and intervention by a human operator based on his or her own human judgment.

Figure 5:
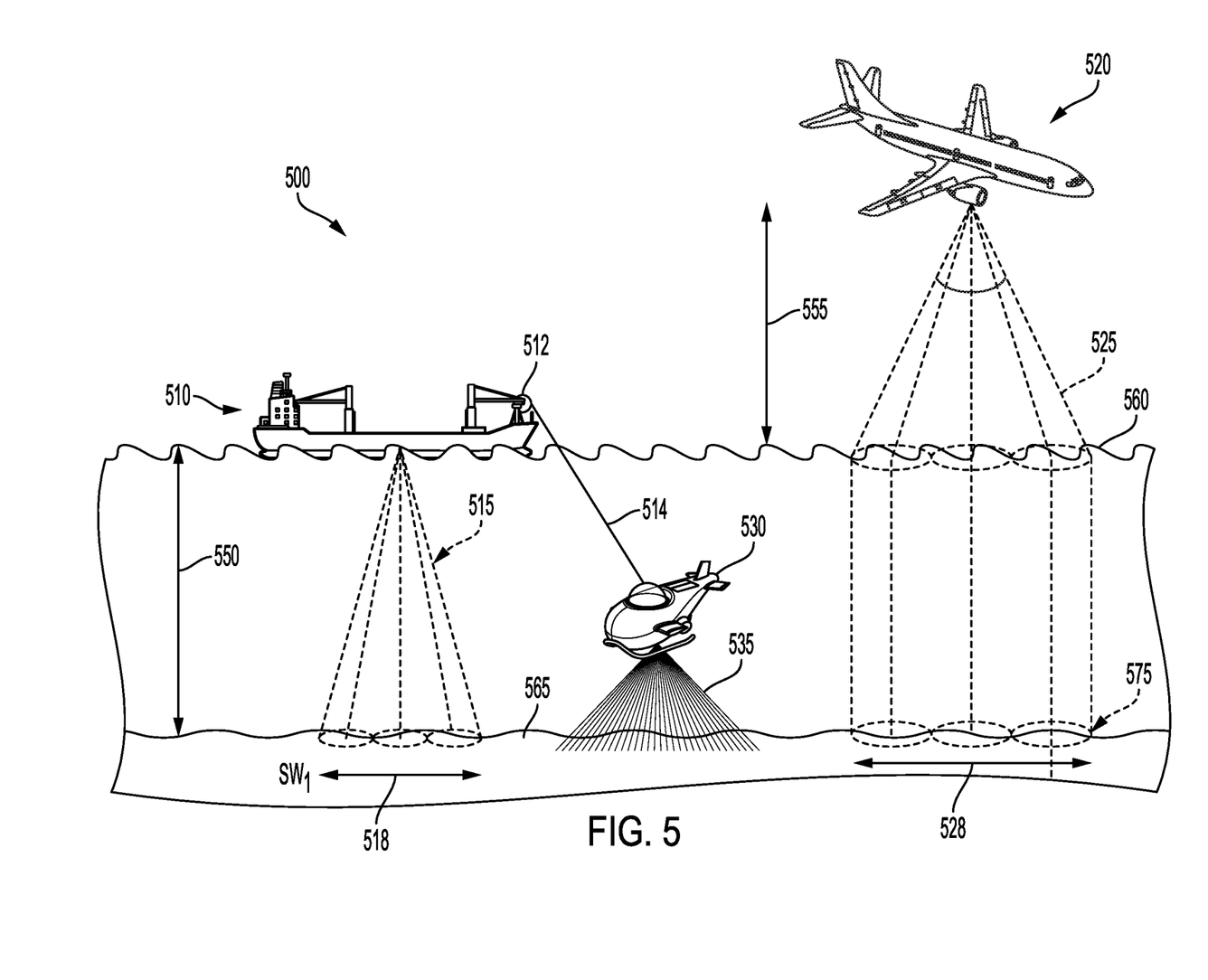
FIG. 5 is a diagrammatic view of an exemplary operating environment in which datasets and/or data images may be acquired, according to an exemplary embodiment of the present disclosure.

FIG. 5 depicts an exemplary operating environment in which datasets and/or data images may be acquired according to an exemplary embodiment of the present disclosure. Datasets and/or data images representing a portion of the Earth's surface, may be used to identify features of interest such as commercially exploitable features or geohazards according to the presently disclosed methods. While FIG. 5 depicts a subsea operating environment, datasets and/or data images may be acquired from any portion of the Earth's surface including both terrestrial surfaces (e.g., land) and subsea surfaces (e.g., ocean floor). As depicted in FIG. 5, data images may in some instances be acquired and/or derived from multibeam echo-sounder (MBES) bathymetry data acquired by a watercraft 510 such as a ship located on the ocean surface 560. In such instances, the MBES dataset may be acquired by a multibeam echo-sounder beam 515 transmitted by a watercraft 510 and having a corresponding beam width 518 on the ocean floor 565 at a water depth 550. The soundwaves resulting from the MBES transmission are reflected by the ocean floor 565 and received at one or more receivers located at the watercraft 510 on the ocean surface 560.

Datasets and/or data images may also be acquired by, for example, autonomous and/or remotely operated submersibles 530, as depicted in FIG. 5. For instance, submersible 530 may be deployed at a predetermined depth in the ocean to acquire datasets and/or data images from a location closer to the ocean floor 565 than is possible with surface watercraft. Submersible 530 may acquire datasets and/or data images using, for example, MBES, optical imagery, spectral imagery, laser bathymetry such as Light Detection and Ranging (LIDAR) bathymetry systems, and any other system capable of acquiring datasets and/or data images suitable for use according to the presently disclosed methods. In some cases, the submersible 530 may be coupled to a watercraft, such a watercraft 510 depicted in FIG. 5, via a conveyance 514. Conveyance 514 may communicatively couple the submersible 530 to the watercraft 510 as well as provide electrical power to the submersible 530. In other cases, the conveyance 514 may simply provide a means by which submersible 530 is physically coupled to watercraft 510 so that the submersible 530 may be recovered and deployed by watercraft 510. Conveyance 514 may be coupled to a motorized system 512 on watercraft 510 for deploying and recovering submersible 530 as well as controlling the depth of submersible 530. Alternatively, submersible 530 may be coupled with another submersible watercraft instead of surface watercraft 510, or submersible 530 may be coupled with an ocean platform or land installation. In other instances, submersible 530 may be a completely separate submersible watercraft that is not coupled with a surface watercraft, platform, land installation, or another submersible watercraft. Irrespective of whether submersible 530 is coupled to another craft or installation, submersible 530 may be manned or piloted or may be an autonomous submersible, including a drone submersible.

Datasets and/or data images used according to the presently disclosed methods, may also include data-derived renderings collected from airborne or satellite-borne laser bathymetry such as Light Detection and Ranging (LIDAR), Airborne Laser Bathymetry (ALB), and LIDAR bathymetry systems. For instance, FIG. 5 depicts an airborne LIDAR bathymetry system carried by aircraft 520 flying at a predetermined altitude 555 above the ocean surface 560. As depicted in FIG. 5, the LIDAR bathymetry system includes a laser transmitter onboard aircraft 520 which transmits a LIDAR swath 525 having a width determined by altitude 555 and corresponding to a laser footprint 575 and laser footprint width 528 on the ocean floor 565. Reflections of the LIDAR swath may be received by an onboard receiver on aircraft 520. While FIG. 5 depicts aircraft 520 as a platform from which airborne datasets and/or data images may be acquired, any suitable aircraft or spacecraft may be used, including satellite-borne laser bathymetry platforms. While LIDAR is illustrated as an exemplary type of data collection apparatus, any other system capable of acquiring datasets and/or data images suitable for use according to the presently disclosed methods may be used, including optical imagery and any spectral imaging technique.

Figure 6:
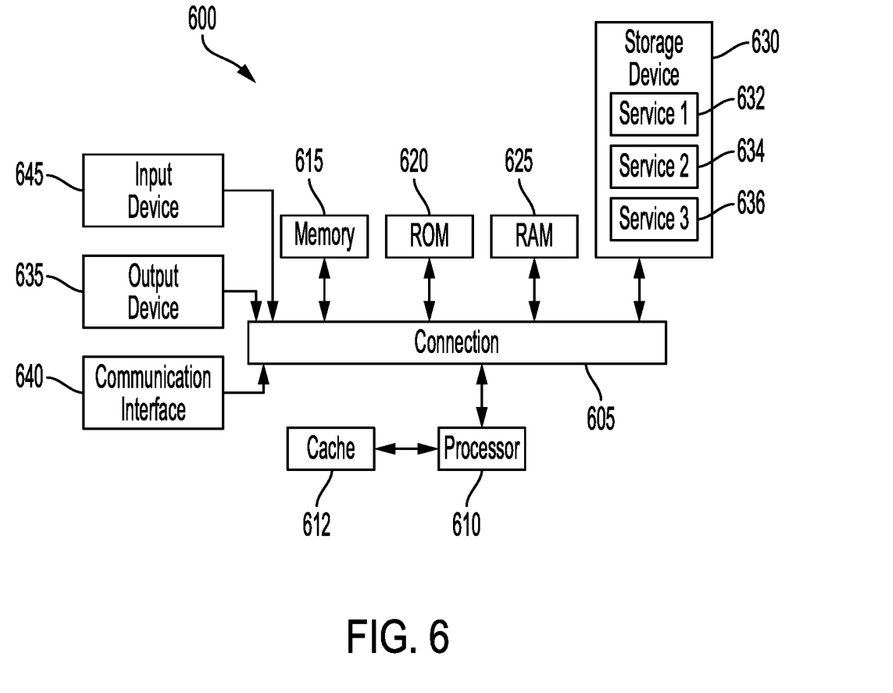
FIG. 6 shows a system for implementing certain aspects of the present technology, according to an exemplary embodiment of the present disclosure.

The presently disclosed methods and techniques may be carried out on any suitable computing system, such as computing system 600 in FIG. 6. For example, the computing system may be located on-board any one of watercraft 510, submersible 530, and aircraft 520, or may be located at any ocean-based platform or terrestrial installation in communication with watercraft 510, submersible 530, and/or aircraft 520.

FIG. 6 shows an example of computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) and random access memory (RAM) to processor 610. Computing system 600 can include a cache of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, or any other suitable medium.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that a system including either one member of the set, or multiple members of the set, or all members of the set, satisfies the claim.

We claim:

1. A computer-implemented method for identifying features of interest in a dataset, the method comprising:
   identifying data variations in a data image or set of dataset, each dataset comprising rendered data;
   identifying one or more features of interest in the dataset based on the identified data variations;
   identifying a feature of interest genus corresponding to each identified feature of interest;
   reclassifying the rendered data based on each of the identified features of interest genuses so as to eliminate background data in the rendered data thereby producing an eliminated background dataset by nulling all background data points and assigning one or multiple values to the identified features of interest genuses; and
   generating a feature of interest dataset for each identified feature of interest genus.

2. The computer-implemented method according to claim 1, further comprising:
   converting the features of interest into polygons for each eliminated background dataset;
   calculating at least one of:
      a geometry of the polygons corresponding to each feature of interest; and a spatial parameter corresponding to the polygons for each feature of interest; and determining at least one of:

whether each feature of interest has a predetermined geometry of significance based on the calculated geometry of the polygons; and whether each feature of interest has a predetermined spatial parameter of significance based on the calculated spatial parameter of the polygons.

3. The computer-implemented method according to claim 1, further comprising:

isolating features of interest having a predetermined size by eliminating the polygons of unnecessary features of interest not having the predetermined size.

4. The computer-implemented method according to claim 3, further comprising:

assigning relative weights to each feature of interest based on an established ranking system.

5. The computer-implemented method according to claim 4, wherein the established ranking system is associated with the geometry of the polygons, relative hazard level, relative risk level, constraint to specific development.

6. The computer-implemented method according to claim 5, wherein the ranked feature of interest map is generated by assigning numerical values to individual polygons, converting the polygons from vector format to raster format, and combining the individual rasters into one ranked raster.

7. The computer-implemented method according to claim 4, further comprising:

generating a ranked feature of interest map for each identified feature of interest genus based on the assigned relative rank weights to each feature of interest.

8. The computer-implemented method according to claim 7, whereby generating the composite feature of interest map for all features of interest corresponding to all feature of interest genuses is created by layering all individual feature of interest maps into one or more maps.

9. The computer-implemented method according to claim 1, further comprising:

generating a feature of interest map for each identified feature of interest genus.

10. The computer-implemented method according to claim 1, further comprising:

generating a composite feature of interest map for all features of interest corresponding to all feature of interest genuses.

11. The computer-implemented method according to claim 1, wherein the feature of interest or feature of interest genus is selected from the group consisting of a geologic formation of interest, a subsea petroleum seep, a terrestrial petroleum seep, a subsea mineral deposit, lost cargo from a vessel, subsea wreckage of a vessel, terrestrial and subsea plane wreckage, unexploded ordinance (UXO), and spacecraft or satellite remains.

12. The computer-implemented method according to claim 1, wherein the feature of interest or feature of interest genus is a geologic feature selected from the group consisting of faults or fault scarps, pockmarks, depressions, channels, canyons, depositional bedforms, erosional bedforms, strudel scouring as a result of sea ice, ice gouges, boulders, dropstones (ice-rafted debris), upheaval zones, ridges, seamounts, hydrothermal vents, gas hydrates, thaw settlement depressions, slump deposits, slope failure deposits, fluid expulsion features (e.g. mud volcanoes, expulsion mounds, pockmarks), and faults.

13. The computer-implemented method according to claim 1, wherein the data image is an optical or visual image.

14. The computer-implemented method according to claim 13, wherein the data image is an optical or visual image selected from the group consisting of greyscale or color photomosaics, high resolution orthoimagery (HRO), images derived from video captures, imagery derived from remotely operated vehicles (ROVs), imagery captured by vessels or submarines, and plane or satellite imagery.

15. The computer-implemented method according to claim 1, wherein the data image is a data-derived rendering based on a terrestrial or subsea digital elevation model.

16. The computer-implemented method according to claim 1, wherein the data image is a data-derived rendering derived from a dataset obtained from one of the group consisting of quantitative slope models, hillshade models, multibeam echosounder (MBES) bathymetry, spectral analyzers or imaging spectroscopy, airborne or satellite-borne hyper-spectral (HS) sensors, airborne or satellite-borne multi-spectral (MS) imaging sensors, airborne or satellite-borne laser bathymetry, Light Detection and Ranging (LIDAR), Airborne Laser Bathymetry (ALB), and LIDAR bathymetry.

17. The computer-implemented method according to claim 1, wherein the data variation is selected from the group consisting of recognizable patterns in the data image, changes in color, changes in contrast or shading, tonal variations, changes in steepness or slope, and changes in curvature.

18. A computer-implemented method for identifying features of interest in a data image using machine learning, the method comprising:

a training phase comprising:

accessing a training data image set with at least one training data image, wherein each training data image comprises a rendering of a feature of interest corresponding to a feature of interest genus;

determining one or more data variation characteristics corresponding to the feature of interest;

storing the one or more data variation characteristics corresponding to the feature of interest in a training database;

determining a feature of interest genus corresponding to the feature of interest based on the determined one or more data variation characteristics;

storing the feature of interest genus corresponding to the feature of interest in the training database; and an identification phase comprising:

accessing a data image comprising at least one feature of interest;

automatically identifying a feature of interest in the data image based on one or more data variation characteristics stored in the training database;

automatically identifying a feature of interest genus corresponding to the identified feature of interest based on the one or more data variation characteristics stored in the training database an analysis phase comprising:

reclassifying the rendered data in the dataset based on the identified feature of interest or the identified feature of interest genus to reduce or eliminate background data in the rendered data and produce an eliminated background dataset by nulling all background data points and assigning one or multiple values to the identified features of interest genuses;

converting the identified features of interest into polygons for each eliminated background dataset.

19. The computer-implemented method according to claim 18, wherein the analysis phase further comprises:
   isolating features of interest having a predetermined size or significance by eliminating the polygons of unnecessary features of interest not having the predetermined size or significance.

\* \* \* \* \*